United States Patent [19]
Brown et al.

[11] Patent Number: 5,108,184
[45] Date of Patent: Apr. 28, 1992

[54] NON-INVASIVE LASER POSITIONING SYSTEM FOR ROTARY ACTUATORS

[75] Inventors: Dana H. Brown, Rochester, Minn.; Timothy J. Chainer, Mahopac, N.Y.; Wayne J. Sohn, Teaneck, N.J.

[73] Assignee: International Business Machines Corporation, Armonk, N.Y.

[21] Appl. No.: 554,038

[22] Filed: Jul. 16, 1990

[51] Int. Cl.$^5$ .............................................. G01B 9/02
[52] U.S. Cl. ..................................... 356/363; 356/358
[58] Field of Search ................ 356/363, 358, 345, 359

[56] References Cited

U.S. PATENT DOCUMENTS

| | | | |
|---|---|---|---|
| 3,979,588 | 9/1976 | Park | 250/239 |
| 4,079,944 | 3/1978 | Durley, III et al. | 274/23 R |
| 4,118,039 | 10/1978 | Kurata et al. | 274/9 RA |
| 4,361,880 | 11/1982 | Kitamura et al. | 369/33 |
| 4,516,854 | 5/1985 | Ludman | 356/363 |
| 4,558,313 | 12/1985 | Garwin et al. | 340/709 |
| 4,564,757 | 1/1986 | LaBudde et al. | 250/239 |
| 4,870,635 | 9/1989 | Block et al. | 356/358 |

OTHER PUBLICATIONS

"5527A Laser Position Transducer Designer's Guide", Hewlett Packard Laser Interferometry, Apr. 1988.
"HP 5527A Laser Position Transducer System", Hewlett Packard.
"Application Note 325-11 Disk Drive Servo-Track Writing", Hewlett Packard.

*Primary Examiner*—Samuel A. Turner
*Assistant Examiner*—Richard E. Kurtz, II
*Attorney, Agent, or Firm*—Perman & Green

[57] ABSTRACT

A laser (10) provides an output beam to an interferometer (12). A portion of the output beam is directed by a beamsplitter to a receiver (18) as a reference beam while the remaining portion of the output beam passes through the beamsplitter and impinges on a plane mirror reflective surface (14a) mounted upon or integrally formed with or upon a surface of a body of interest, such as rotary actuator or arm (14). The arm has a fixed center of rotation O and rotates through an angular range indicated by theta-max. Phi is the angle of incidence of the laser beam with the arm in its original position when theta equals zero. $|\overline{OC}|$ and $|\overline{CD}|$ are distances which locate the intersection point between the arm and the laser beam relative to the center of rotation O when theta equals zero. A corner cube (16) is located at a convergence plane and returns all reflected beams back to the plane mirror and hence to the receiver via the interferometer. The interferometer and receiver operate to provide a determination of the position of the arm relative to a reference position, the determined position being used to cause a servo track or tracks to be written upon a medium at a desired position.

22 Claims, 5 Drawing Sheets

CONVERGENCE PLANE

NON-INVASIVE LASER POSITIONING SYSTEM FOR ROTARY ACTUATORS

FIELD OF THE INVENTION

This invention relates generally to optical position sensing method and apparatus and, in particular, to method and apparatus for accurately locating a position of a rotary actuator, such as a read/write head actuator arm of a magnetic disk drive.

BACKGROUND OF THE INVENTION

Laser position transducers play an increasingly important role in the kinematic and dynamic analysis of mechanisms An interference pattern generated between a reference light beam and a probe light beam reflecting off of a body of interest is used to derive positional information for the body of interest A basic assumption in all such laser position transducers is that the probe light beam is returned to an optical receiver despite a relative motion between the receiver and the probed body Laser position transducers are known for determining a position of linear or rotary actuators. One type of system employs a laser output having two components of the same frequency. One component is sent directly to a receiver while the other component is reflected off a moving actuator before being sent to the receiver. The phase shift between the two components is converted into position information for the actuator. Another type of system employs a laser output having two different frequency components. One component is sent directly to a receiver while the other component is reflected off of a moving actuator before being sent to the receiver. The change in the beat frequency at the receiver due to actuator motion is converted into actuator position information.

For linear actuators, the laser beam can be simply reflected from a plane mirror rigidly attached to the actuator For rotary actuators, such as a disk drive actuator arm, corner cube reflectors have been employed to reflect the laser beam As is well known, a corner cube reflects a ray along a path parallel to an incident ray, independently of the incident angle.

However, relative to a plane mirror corner cubes are heavy, large and expensive. As such their suitability for certain applications, such as their inclusion within a servo-writing process for a magnetic recording device, results in several significant problems.

For example, a system for attaching and subsequently removing the corner cube from the drive's rotary actuator must be devised. As a result, the disk drive must typically be servo-written while not completely assembled. However, the presence of a relatively massive corner cube during servo-writing affects the natural frequencies of the disk drive. As a result, the subsequent removal of the corner cube and the completion of the assembly of a disk drive after it has been servo-written may cause distortions in the servo-pattern that results in track misregistration for the recording heads.

In U.S. Pat. No. 3,979,588, issued Sept. 7, 1976 (Park), in U.S Pat. No. 4,079,944, issued Mar. 21, 1978 (Durley, III et al.) and in U.S. Pat. No. 4,361,880, issued Nov. 30, 1982 (Kitamura et al) there are disclosed photoelectric sensors for use with phonograph records. Photoelectric sensors detect light reflecting from the smooth surface of the record between recorded portions. This technique provides a position sensor only to the extent that an on-target or off-target indication is indicated. This technique does not actually measure any change in position and, furthermore, there is no rotation involved.

In U.S. Pat. No. 4,118,039, Oct. 3, 1978, Kurata et al. employ a virtual image of a light source in a semi-transparent mirror as a pointer to show location on a phonograph record. This technique does not actually measure position nor does it involve rotation.

In commonly assigned U.S Pat. No. 4,558,313, issued Dec. 10, 1985, Garwin et al. disclose an indicator that relies on light reflecting from a rotating mirror and returning to a stationary receiver. The receiver is a photoelectric device that determines if the light ray has been blocked. This technique does not measure the position of a rotating body but instead uses an independently determined position of a rotating body to locate where a blockage occurs. Light is returned to the receiver by a surface that is made long enough to catch all scattered rays, the surface being covered with reflective beads The beads send the light back along paths approximately the same as the incident paths.

In U.S. Pat. No. 4,564,757, Jan. 14, 1986, LaBudde et al. disclose a position sensor for a pivoted galvo mirror in an optical disk read/write apparatus.

However, what is not taught in the prior art and what is thus an object of the invention is the provision of a simple and accurate technique, and apparatus for accomplishing same, for measuring a position of a rotary actuator. The technique employs a plane reflector attached to or integral with the actuator for twice reflecting laser light from a source to a corner cube and back to a receiver.

SUMMARY OF THE INVENTION

The foregoing problems are overcome and the objects of the invention are realized by apparatus and method for determining an angular position of a rotary actuator such as an actuator arm of a disk drive, the actuator arm having a fixed center of rotation In accordance with a presently preferred embodiment of the invention the apparatus includes a laser which provide a laser beam to an interferometer. The interferometer splits the beam into a reference component and a probe component. The laser and interferometer are positioned so that the probe light beam is incident upon a plane mirror coupled to the arm for once reflecting the incident light beam. The apparatus further includes a reflector, preferably a corner cube reflector, positioned at a convergence plane relative to the arm for intercepting the once reflected beam and for returning the once reflected beam to the plane mirror along a path substantially parallel to a path traveled by the once reflected beam. The plane mirror once more reflects the returned beam in a direction generally parallel to the incident beam and towards the interferometer that receives the twice reflected beam. The interferometer sends the twice reflected beam and the reference laser beam to a receiver.

In a system employing a single frequency the receiver measures the phase difference between the probe and reference beam, this phase difference being a function of the position of the actuator arm. In a two frequency system, the receiver measures the change in beat frequency between the probe and reference beam, this change being a function of the position of the arm.

The convergence plane is predetermined to include a first point to which the incident beam is once reflected by the actuator arm from both a first extreme rotational position of the actuator arm and from a second extreme rotational position of the actuator arm. The convergence plane is perpendicular to the incident light beam once reflected by the actuator arm at a predetermined rotational position. The convergence plane and the light beam with which it is perpendicular intersect at a second point The incident light beams that are once reflected off of the actuator arm, at all rotational positions between the first and second extremes, intersect a line segment extending from the first point to the second point. The corner cube is positioned along this line segment.

In a special case where the plane of reflection on the actuator arm includes a point coincident with the center of rotation of the actuator arm the plane of convergence also includes the point coincident with the center of rotation of the actuator arm. In this special case the light beam passing through the second point is once reflected by the actuator arm at a rotational position that is substantially midway between the first and the second extreme rotational positions.

The invention also encompasses methods of servo-writing a disk in accordance with the foregoing and further encompasses an actuator arm for a disk drive, the actuator arm being constructed to include a reflective surface that functions as a plane mirror.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The ensuing description of the invention is made in the context of a servo track writing system for a rotating disk data storage device. This is an important application in that modern data storage systems have a significantly reduced track-to-track spacing that makes conventional open-loop head positioning apparatus obsolete. As a result, modern data storage systems rely on a closed loop head positioning system. Such closed loop positioning systems employ a position feedback signal generated from prerecorded tracks that must be accurately located upon the surface of the rotating media. The act of prerecording the position tracks is referred to as servo-writing the disk. This function is typically done once when the drive is assembled. As can be appreciated, the accuracy and repeatability with which the position tracks are recorded are critical to the subsequent operation of the data storage device. It should be realized however that the teaching of the invention is not intended to be limited to only such applications or for use only with data storage systems.

An important optical principle that is recognized and exploited by the laser position detection system of the invention is that by positioning an incident beam at a proper angle to a plane mirror carried by a rotary actuator the beams that are reflected as the actuator rotates can be made to converge. While the beams do not converge to a point, there is instead a plane at which maximum convergence occurs. This plane is referred to herein as a convergence plane.

Figure 1:
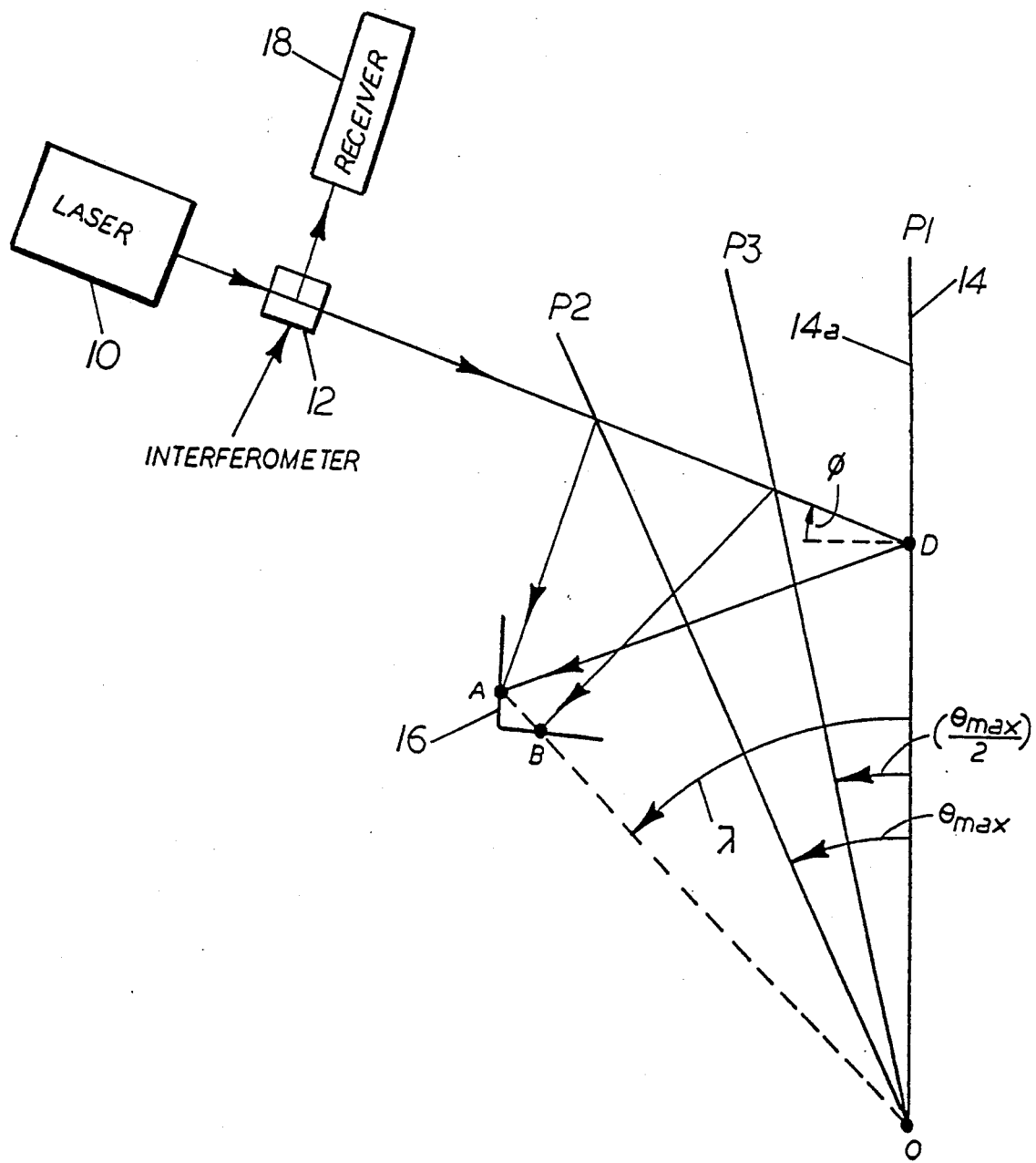
FIG. 1 is a simplified schematic diagram showing the components of the position measuring system of the invention.

Referring to FIG. 1 a laser 10 provides an output beam to an interferometer 12. By example, laser 10 may be a HeNe device and the interferometer 12 may be a Michelson interferometer. A portion of the output beam is directed by a beamsplitter to a receiver 18 as a reference beam while the remaining portion of the output beam passes through the beamsplitter and impinges on a reflective surface 14a mounted upon or integrally formed with or upon a surface of a body of interest, here a rotary actuator or arm 14. Arm 14 has a fixed center of rotation designated as 0. The arm rotation is indicated by theta. The angular values for theta range from zero to theta-max. Phi is the angle of incidence of the laser beam with the arm 14 at an extreme position of the arm where theta is equal to zero degrees. A corner cube 16 is placed at the convergence plane and reflects the beams back to the arm 14 reflective surface 14a and to the receiver 18 via the interferometer 12. The interferometer 12 and receiver 18 operate in a known fashion to provide an indication of the position of the arm 14 relative to a reference position, the relative position being used to cause a servo track or tracks to be written upon a medium at desired positions. The operation of the interferometer 12 and receiver 18 is not germane to an understanding of the invention and will not be further discussed.

There are several advantages gained by placing the corner cube 16 at the plane of maximum beam convergence. A first advantage is that this placement permits the use of a corner cube having minimum dimensions. A second advantage is that beams that are incident at different points on the corner cube 16 are consequently incident upon different points of a radiation sensitive surface of the receiver 18. Such movement of the received radiation along the receiver 18 may cause a loss of signal and therefore is preferably minimized by locating the corner cube 16 at the convergence plane.

In FIG. 1 the reflecting surface on the arm 14 is shown to be coincident with a line through the center of rotation to facilitate the description of the invention. However, this need not be the case and the reflective surface may be offset from this line. Arm 14 is shown in three positions across its total stroke (theta-max). At the original position Pl, when theta is zero, the incident light beam intersects the arm at point D with an angle of incidence indicated by $\phi$. In order for all reflected rays to converge the angle of incidence $\phi$ upon the arm must be:

$$0 \leq \phi(90 - \phi_{max}).$$

Using Chebychev approximation theory, the plane of maximum convergence of the reflected rays may be theoretically determined The location of the convergence plane can also be found using a simple construction. Point A is the point of intersection the reflected rays off the arm 14 at its two most extreme positions, indicated as Pl and P2. The plane of maximum convergence thus lies along line OA. The beam reflected off the arm 14 halfway through its stroke, indicated as position P3, intersects this plane at point B. All other reflected rays can be readily shown to fall between points A and B. The length of line segment OA in FIG. is:

$$|OA| = \frac{|OD|(\tan\theta_{max})}{\left(2\tan\frac{\theta_{max}}{2}\right)\sqrt{1+\tan^2\phi}}\left(1+\tan^2\frac{\theta_{max}}{2}\right)$$

and the length of line AB is, $$|AB| = \frac{|OD|\left(\tan\frac{\theta_{max}}{2}\right)(\tan\theta_{max})}{\sqrt{1+\tan^2\phi}}.$$

The angle between lines OA and OD is indicated by lambda and is:

$$\lambda = \phi + \theta_{max}.$$

Figure 2:
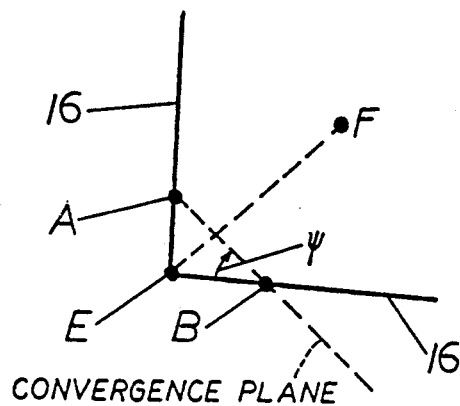
FIG. 2 is a simplified schematic diagram showing the alignment of the corner cube with the convergence plane.

A corner cube is constructed from three mirrored surfaces aligned so that they are mutually perpendicular. The point of intersection of all three surfaces is herein referred to as the apex. A line drawn through the apex and having the same angle with all three surfaces is herein referred to as the bisector. The position of a corner cube is described by locating its apex and bisector. In two dimensions, a corner cube functions as two mirrored surfaces perpendicular to one other. For simplicity the figures include this two-dimensional representation of a corner cube. FIG. 2 shows the alignment of this two-dimensional representation with the convergence plane For alignment purposes a three dimensional corner cube has the apex coincident with point E and the bisector coincident with the bisector EF. The two mirrored surfaces intersect the plane of convergence at points A and B so that:

$$\cotan\Psi = (\sin\theta_{max} + \sqrt{\sin^2\theta_{max}+4\cos\theta_{max}})/2;$$

where $\Psi$ indicates the angle between lines BE and BA. The length of line segment EB is $$|\overline{EB}| = |\overline{AB}|\cos\Psi.$$

Figure 3:
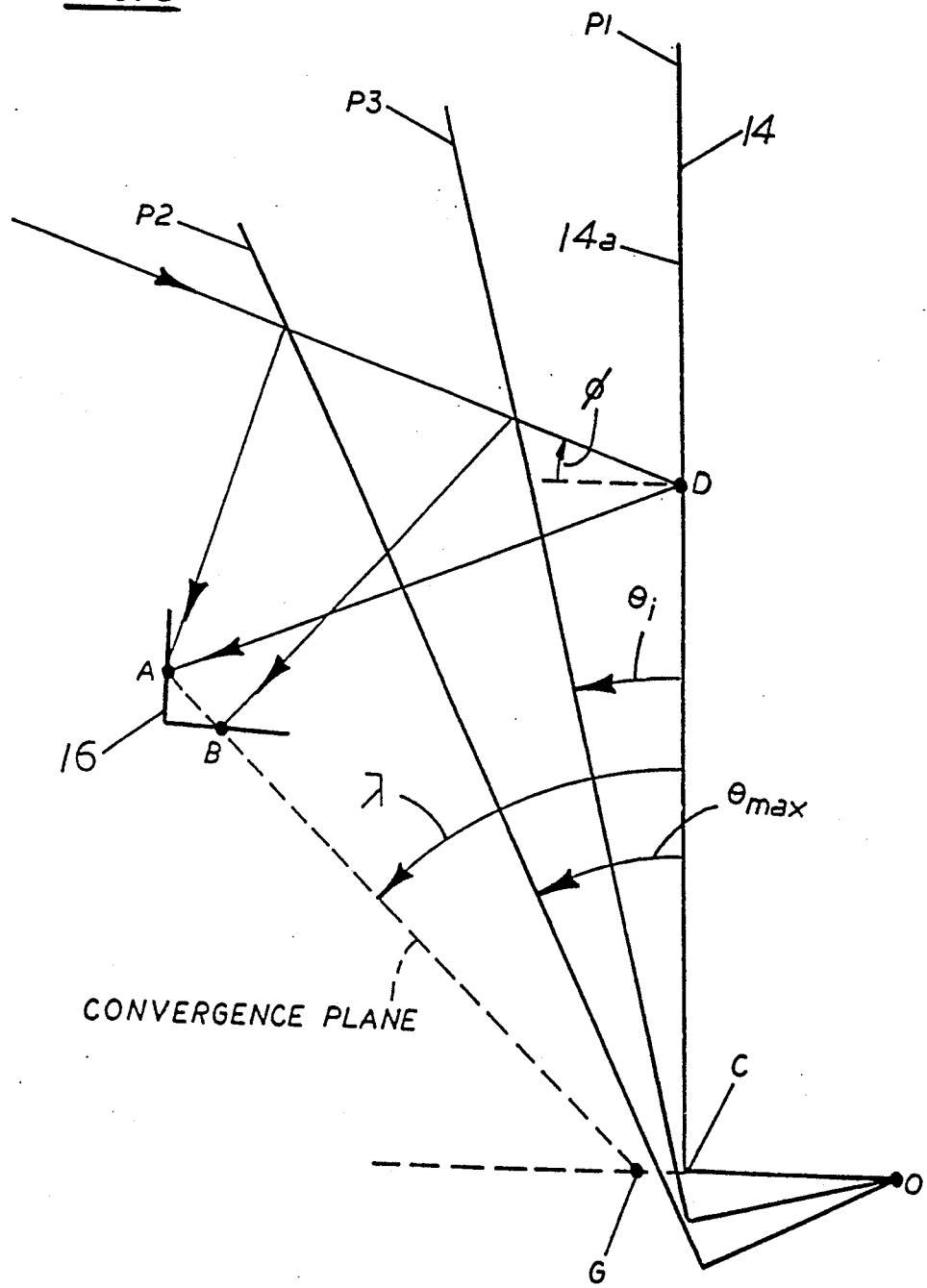
FIG. 3 is a simplified schematic diagram showing, for the most general case, the components of the position measuring system of the invention.

The theory set forth above is valid when the rotating reflective surface is collinear with the center of rotation. FIG. 3 shows the more general case where the rotating reflective surface is offset from the center of rotation by distance $|\overline{OC}|$. Point A is the point of intersection of the once reflected rays off of arm 14 at its two most extreme rotational positions, indicated as Pl and P2. The plane of convergence is collinear with line AB where B is a point intersected by the ray once reflected off the arm 14 when theta is equal to theta-i. Theta-i is the rotational position that is predetermined to have a once reflected ray that is perpendicular to the plane of convergence. All other reflected rays can be shown to fall between points A and B. The rotational position theta-i is the solution to the following equation:

$$A_1 t_i^3 + A_2 t_i^2 \sqrt{1+t_i^2} + A_3 t_i \sqrt{1+t_i^2} + A_4 t_i +$$

$$A_5 \sqrt{1+t_i^2} + A_6 = 0$$

where $t_i = \tan\theta_i;$ $A_1 = |OC|\tan\theta_{max}\tan\phi;$ $A_2 = |OC|\{\tan\phi - \tan\theta_{max} -$ $(\tan\phi + \tan\theta_{max})\sqrt{1+\tan^2\theta_{max}}\} - |CD|\tan\theta_{max};$ $A_3 = (-2|OC|\tan\phi - 2|CD|)\tan\theta_{max};$ $A_4 = |OC|\tan\phi\tan\theta_{max};$ $A_5 = |CD|\tan^2\theta_{max} +$ $|OC|(\tan\phi + \tan\theta_{max})\sqrt{1+\tan^2\theta_{max}} - |OC|\tan\phi;$ and $A_6 = -|OC|\tan\theta_{max}.$ It follows that length $|\overline{OG}|$ is given by:

$$|\overline{OG}| = |OC|\frac{\cos(\theta_i+\phi)}{\cos(2\theta_i+\phi)}.$$

The angle of line OG with respect to line CD is therefore:

$$\lambda = \phi + 2\phi_i.$$

Furthermore, the positions of A and B are given by $$|\overline{GA}| = Z(O)$$

and $$|\overline{AB}| = Z(O) - Z(\theta_i),$$

where $Z(\theta) = (|\overline{CD}|\cos(2\theta+\theta)+(|\overline{OC}|-|\overline{OG}|))$
$\sin(2\theta+\theta)+2 (|\overline{CD}|+|\overline{OC}|\tan(\theta/2))$
$\sin\theta\sin(\theta+\phi))/\cos(2\theta-2\theta_i).$ The corner cube in FIG. 2 is positioned so that:

$$\cotan\Psi = (\sin 2\theta_i + \sqrt{\sin^2 2\theta_i + 4\cos 2\theta_i})/2$$

and $$|\overline{EB}| = |\overline{AB}|\cos\Psi.$$

It is noted that when $|\overline{OC}|=0$ then $\theta_i=\theta_{max}/2$ and point G is coincident with point 0 resulting in the general case reducing to the special case described earlier.

As a result of the foregoing if the location of rotation point 0 is known in conjunction with the two extreme positions of the actuator 14 and the values of $\phi$, $|\overline{OC}|$ and $|\overline{CD}|$ then the precise location of the convergence plane and the corner cube 16 is readily determined.

Some corner cube constructions are of a solid piece of glass having three orthogonal reflective sides and a transparent fourth side which is perpendicular to the cube bisector and through which all rays pass. In this case the index of refraction (n) of the glass must be taken into account. This involves not aligning the physical apex of the cube with point E in FIG. 2. Instead, point E is made coincident with a virtual apex that is collinear with the bisector. If the distance from the fourth face of the corner cube to the physical apex is denoted by L then the distance from the fourth face to the virtual apex is given by L/n.

Figure 4:
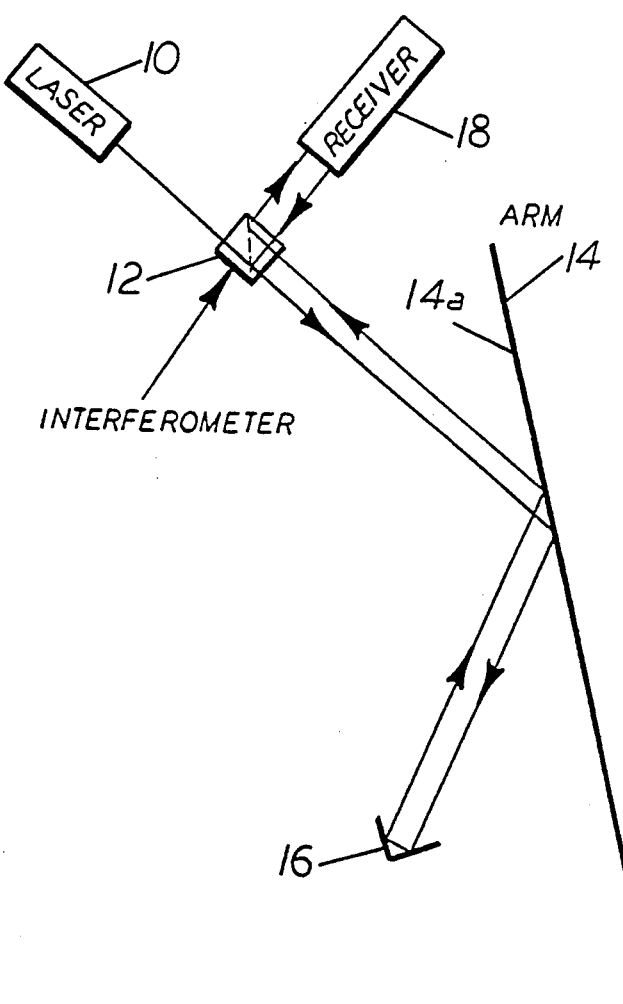
FIG. 4 depicts a total beam path length from laser source to receiver.

In FIG. 4 it can be seen that, ignoring the effect of the interferometer 12, a received beam has been four times reflected. That is, the received beam is reflected a first time from the arm 14, twice by internal reflection within the corner cube 16, and once more by reflection from the arm 14. The second reflection from the arm 14 also tends to cancel any wavefront tilt imparted to the beam by the first reflection from the arm 14. Although at least four reflections are involved in the path from the laser 10 to the receiver 18 for this discussion the beam is considered to be once reflected when first reflecting from the arm 14 and to be twice reflected when reflecting the second time from the arm 14 after being returned by the corner cube 16.

The relationship between the change in length of the ray and the change in rotational position of the arm 14 is given by the following equations. In these equations $\Delta P$ is used to denote the change in the length of the ray from a nominal length when theta is zero.

$$\Delta P(\theta) = 2\{P_1(0) + P_2(0) + P_3(0) - P_1(\theta) - P_2(\theta) - P_3(\theta)\},$$

where $$P_1(\theta) = \left(|CD| + |OC|\tan\frac{\theta max}{2}\right)\frac{\sin\theta max}{\cos(\theta max + \phi)} -$$

$$\left(|CD| + |OC|\tan\frac{\theta}{2}\right)\frac{\sin\theta}{\cos(\theta + \phi)},$$

$$P_2(\theta) = \frac{|CD| - z(\theta)\cos(\phi + 2\theta i)}{\sin(2\theta + \phi)} +$$

$$\frac{\left(|CD| = |OC|\tan\frac{\theta}{2}\right)\sin\phi\sin\theta}{\cos(\theta + \phi)\sin(2\theta + \phi)}$$

$$P_3(\theta) = |AB|\sin\Psi\cos(2\theta - 2\theta i - \Psi) -$$

$$(|GA| - z(\theta))\sin(2\theta - 2\theta i),$$

and $z(\theta)$, $|AB|$, $|GA|$, $\theta i$ and $\Psi$ are as defined earlier.

Figure 5:
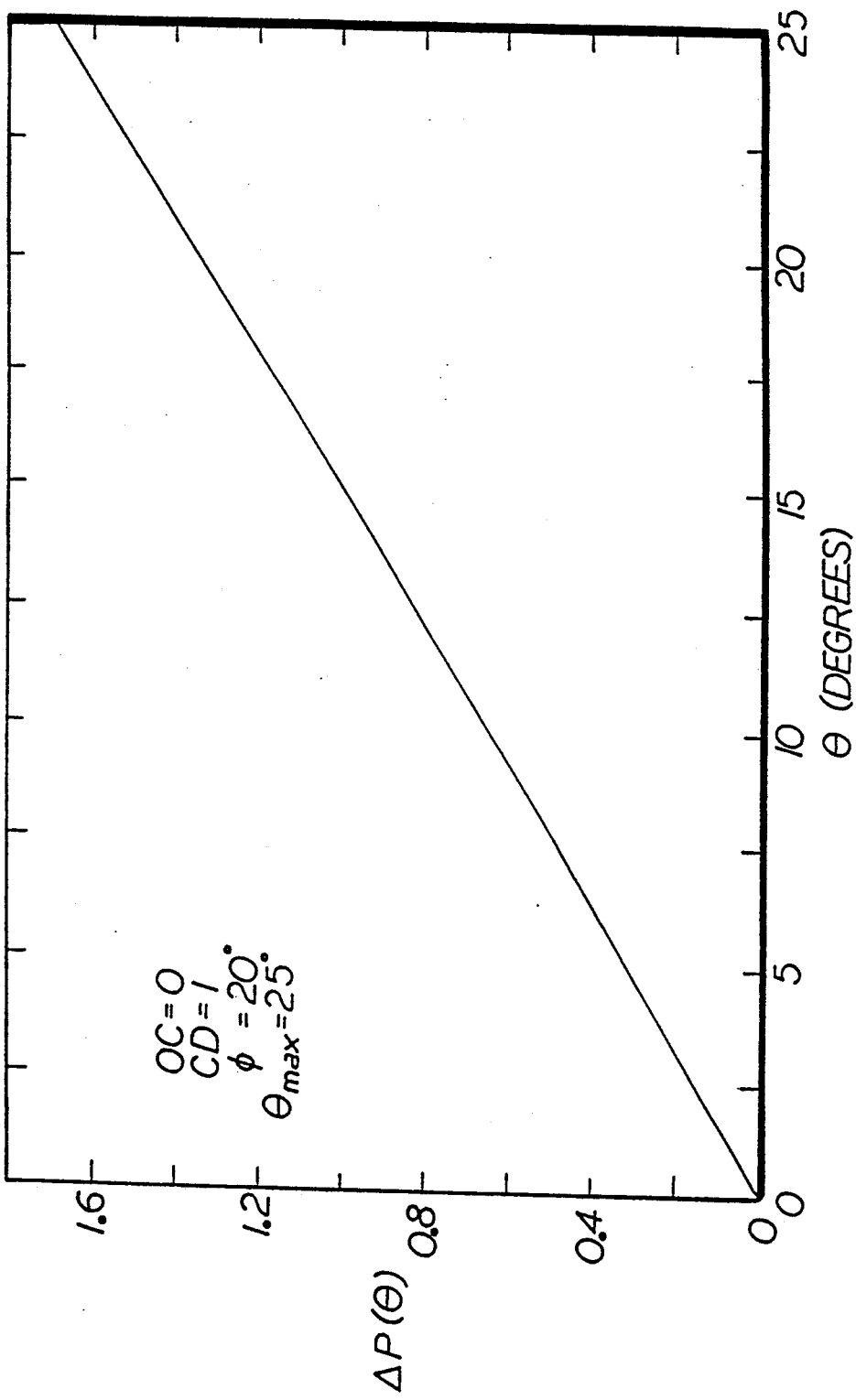
FIG. 5 graphically depicts the change in the length of the beam as a function of actuator rotation.

FIG. 5 is a plot illustrating the length of the light beam ($P(\theta)$) as a function of the rotation of the arm 14. In this example it is assumed that $|\overline{OC}|=0$, $|\overline{CD}|=1$, $\theta=20°$ and $\theta_{max}=25°$. This plot shows a substantially linear relationship between beam length and the rotation of the arm. This linearity provides for a relatively simple calibration. The sensitivity of this technique, as well as the location of the various components are a function of the inputs $|\overline{OC}|$, $|\overline{CD}|$, $\phi$ and $\theta_{max}$.

Figure 6:
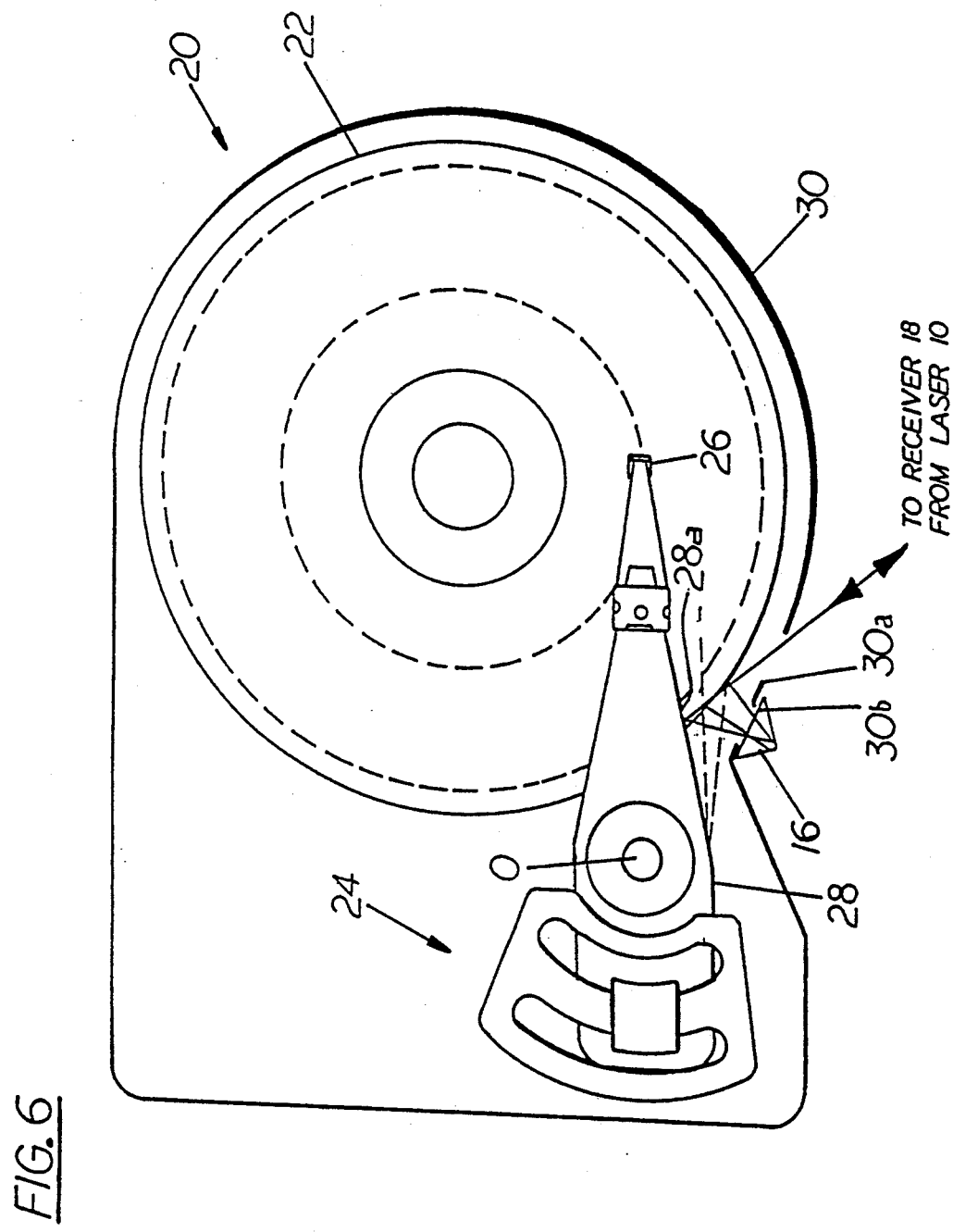
FIG. 6 shows a simplified top view of a disk drive being servo-written in conjunction with the rotary actuator position measuring apparatus of the invention.

FIG. 6 shows a simplified top view of a disk drive 20 being servo written in conjunction with the rotary actuator position measuring apparatus of the invention. Drive 20 includes at least one rotating disk 22 and an arm mechanism 24. The arm mechanism 24 supports and positions at least one read/write head 26 by means of a rotary actuator 28 Actuator 28 rotates about the point 0 and conveys the read/write head 26 in an arcuate manner relative to the surface of the rotating disk 22.

There are several methods of incorporating the invention into the servo writing of the disk drive 20. In one embodiment the laser beam is reflected off a small plane mirror that is physically attached to the actuator 28. In another embodiment the actuator 28 is provided with an integral reflective surface, such as polished region 28a, that functions as a plane mirror. In either embodiment the plane mirror is preferably left as a permanent part of the actuator 28. Consequently, the disk drive 20 may be fully assembled before servo-writing, thereby overcoming one of the disadvantages of the prior art. Also, in that a relatively massive corner cube is not required to be mounted to the actuator 28 little or no change in the actuator's natural resonance is induced during servo-writing, thereby overcoming another disadvantage of the prior art. An opening 30a in a drive housing 30 is necessary to pass the incident and twice reflected laser light beams and another small opening 30b is necessary to pass the once reflected beam and the beam returned by the externally mounted corner cube 16. These small openings are closed with tape or other suitable material when the servo-writing process is completed. As a result, the invention permits the disk drive 20 to be servo-written under normal operating conditions and in a substantially fully assembled condition.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. Apparatus for determining an angular position of a body having a fixed center of rotation comprising:

laser means positioned for providing an incident light beam to the body;

mirror means coupled to the body for reflecting the incident light beam therefrom;

means positioned at a convergence plane relative to the body for intercepting the reflected beam and for returning the reflected beam to the mirror means along a path substantially parallel to a path traveled by the reflected beam, the mirror means once more reflecting the beam in a direction generally parallel to the incident beam; and means for receiving the twice reflected beam and for comparing the twice reflected beam to a reference beam to determine the position of the body.

2. Apparatus as set forth in claim 1 wherein the mirror means is comprised of a plane mirror means attached to the body.

3. Apparatus as set forth in claim 1 wherein the intercepting means is comprised of a corner cube reflector means.

4. Apparatus as set forth in claim 1 wherein the mirror means is comprised of a reflective surface portion of the body.

5. Apparatus as set forth in claim 1 wherein the receiving means includes interferometer means.

6. Apparatus as set forth in claim I wherein the body is comprised of an actuator arm for a data storage device of a type having rotating magnetic media and at least one read/write head coupled to the actuator arm.

7. Apparatus as set forth in claim 1 wherein the mirror means has a reflective surface that lies along a line collinear with the fixed center of rotation and wherein the convergence plane is predetermined to lie along a line from a point coincident with the center of rotation of the body to a first point to which the incident beam is reflected by the body from a first extreme rotational position of the body and from a second extreme rotational position of the body.

8. Apparatus as set forth in claim 7 wherein the intercepting means lies along the line from at least the first point to at least a second point, the second point being a point on the line to which the incident beam is reflected by the body at a rotational position that is substantially midway between the first and the second extreme rotational positions.

9. Apparatus as set forth in claim 1 wherein the mirror means has a reflective surface that lies along a line offset from a line that passes through the fixed center of rotation, wherein a point A is a point of intersection of the reflected beam from the body at two most extreme rotational positions of the body, and wherein the convergence plane is collinear with a line AB where B is a point intersected by the reflected beam when a rotational angle (theta) of the body is equal to theta-i, theta-i being a rotational position of the body where a reflected beam is perpendicular to the plane of convergence.

10. Apparatus as set forth in claim 9 wherein the intercepting means lies along the line from at least point A to point B.

11. A method for determining an angular position of a body having a fixed center of rotation comprising the steps of:
providing an incident light beam to the body;
once reflecting the incident light beam from the body;
intercepting the once reflected light beam at a point along a convergence plane located away from the body;
returning the once reflected light beam to the body along a path substantially parallel to a path traveled by the once reflected light beam;
twice reflecting the light beam in a direction generally parallel to the incident light beam; and
receiving the twice reflected light beam and comparing the twice reflected beam to a reference beam to determine a position of the body relative to a reference rotational position.

12. A method as set forth in claim 11 wherein the body includes a reflective surface that lies along a line collinear with the center of rotation and wherein the convergence plane is predetermined to lie along a line from a point coincident with the center of rotation of the body to a first point to which the incident light beam is reflected by the body from a first extreme rotational position of the body and from a second extreme rotational position of the body.

13. A method as set forth in claim 11 wherein the body includes a reflective surface that lies along a line offset from a line that passes through the center of rotation, wherein a point A is a point of intersection of the reflected beam from the body at two most extreme rotational positions of the body, and wherein the convergence plane is collinear with a line AB where B is a point intersected by the reflected beam when a rotational angle (theta) of the body is equal to theta-i, theta-i being a rotational position of the body where a reflected beam is perpendicular to the plane of convergence.

14. A method as set forth in claim 12 wherein the step of intercepting occurs along the line from at least the first point to at least a second point, the second point being a point on the line to which the incident beam is reflected by the body at a rotational position that is substantially midway between the first and the second extreme rotational positions.

15. A method as set forth in claim 13 wherein the step of intercepting occurs along the line from at least point A to at least point B.

16. Apparatus for determining an angular position of an actuator arm of a disk drive, the actuator arm having a fixed center of rotation comprising:
laser means positioned for providing an incident light beam to the arm;
plane mirror means coupled to the arm for reflecting the incident light beam therefrom;
means positioned at a convergence plane relative to the arm for intercepting the reflected beam and for returning the reflected beam to the plane mirror means along a path substantially parallel to a path traveled by the reflected beam, the plane mirror means once more reflecting the beam in a direction generally parallel to the incident beam; and
interferometer means for sending the twice reflected beam and a reference beam to a receiver for comparing the twice reflected beam to the reference laser beam to determine the position of the arm.

17. Apparatus as set forth in claim 16 wherein the plane mirror means is attached to the arm.

18. Apparatus as set forth in claim 16 wherein the plane mirror means is comprised of a reflective surface portion of the arm.

19. Apparatus as set forth in claim 16 wherein the intercepting means is comprised of a corner cube reflector means.

20. An actuator arm for use in conveying at least one read/write head means in an arcuate manner relative to a surface of a rotating data storage means, the actuator arm comprising plane mirror means coupled thereto for reflecting, during a procedure performed to locate a position of the actuator arm, a light beam to and from a reflector means positioned along a convergence plane located away from the actuator arm.

21. An actuator arm as set forth in claim 20 wherein the plane mirror means is comprised of a plane mirror that is rigidly attached to the actuator arm.

22. An actuator arm as set forth in claim 20 wherein the plane mirror means is comprised of a reflective surface portion integral with the actuator arm.

* * * * *

UNITED STATES PATENT AND TRADEMARK OFFICE
CERTIFICATE OF CORRECTION

PATENT NO. : 5,108,184

DATED : April 28, 1992

INVENTOR(S) : Dana H. Brown, et al

Page 1 of 4

It is certified that error appears in the above-identified patent and that said Letters Patent is hereby corrected as shown below:

The equation appearing at Col. 4, line 63, should read as follows:

$$0 \leq \emptyset \leq (90 - \emptyset_{max}).$$

The equation appearing at Col. 5, line 20, should read as follows:

$$|\overline{AB}| = \frac{|\overline{OD}|\left(\tan\frac{\theta_{max}}{2}\right)(\tan\theta_{max})}{\sqrt{1 + \tan^2\phi}}.$$

The equation appearing at Col. 6, line 13, should read as follows:

$$A_1 = |\overline{OC}|\tan\theta_{max}\tan\phi;$$

The equation appearing at Col. 6, beginning at line 15 should read as follows:

$$A_2 = |\overline{OC}|\{\tan\phi - \tan\theta_{max} - (\tan\phi + \tan\theta_{max})\sqrt{1 + \tan^2\theta_{max}}\} - |\overline{CD}|\tan\theta_{max};$$

The equation appearing at Col. 6, line 19, should read as follows:

$$A_3 = (-2|\overline{OC}|\tan\phi - 2|\overline{CD}|)\tan\theta_{max};$$

UNITED STATES PATENT AND TRADEMARK OFFICE
CERTIFICATE OF CORRECTION

PATENT NO. : 5,108,184

DATED : April 28, 1992

INVENTOR(S) : Dana H. Brown, et al

It is certified that error appears in the above-identified patent and that said Letters Patent is hereby corrected as shown below:

The equation appearing at Col. 6, line 21, should read as follows:

$$A_4 = |\overline{OC}| \tan\phi \tan\theta_{max}.$$

The equation appearing at Col. 6, beginning at line 22 should read as follows:

$$A_5 = |\overline{CD}| \tan^2\theta_{max} + |\overline{OC}|(\tan\phi + \tan\theta_{max})\sqrt{1 + \tan^2\theta_{max}} - |\overline{OC}| \tan\phi:$$

The equation appearing at Col. 6, line 28, should read as follows:

$$A_6 = -|\overline{OC}| \tan\theta_{max}.$$

The equation appearing at Col. 6, line 33, should read as follows:

$$|\overline{OG}| = |\overline{OC}| \frac{\cos(\theta_i + \phi)}{\cos(2\theta_i + \phi)}.$$

The equation appearing at Col. 6, line 50, should read as follows:

$$Z(\theta) = (|\overline{CD}|\cos(2\theta + \phi) + (|\overline{OC}| - |\overline{OG}|))$$
$$\sin(2\theta + \phi) + 2(|\overline{CD}| + |\overline{OC}|\tan(\theta/2))$$
$$\sin\theta\sin(\theta + \phi))/\cos(2\theta - 2\theta_i).$$

UNITED STATES PATENT AND TRADEMARK OFFICE
CERTIFICATE OF CORRECTION

PATENT NO. : 5,108,184

DATED : April 28, 1992

INVENTOR(S) : Dana H. Brown, et al

It is certified that error appears in the above-identified patent and that said Letters Patent is hereby corrected as shown below:

The equation appearing at Col. 7, beginning at line 40 should read as follows:

$$P_1(\theta) = \left(|\overline{CD}| + |\overline{OC}|\tan\frac{\theta_{max}}{2}\right)\frac{\sin\theta_{max}}{\cos(\theta_{max} + \phi)} - \left(|\overline{CD}| + |\overline{OC}|\tan\frac{\theta}{2}\right)\frac{\sin\theta}{\cos(\theta + \phi)}.$$

The equation appearing at Col. 7, beginning at line 47 should read as follows:

$$P_2(\theta) = \frac{|\overline{CD}| - x(\theta)\cos(\phi + 2\theta)}{\sin(2\theta + \phi)} + \frac{\left(|\overline{CD}| - |\overline{OC}|\tan\frac{\theta}{2}\right)\sin\phi\sin\theta}{\cos(\theta + \phi)\sin(2\theta + \phi)}$$

UNITED STATES PATENT AND TRADEMARK OFFICE
CERTIFICATE OF CORRECTION

PATENT NO. : 5,108,184

DATED : April 28, 1992

INVENTOR(S) : Dana H. Brown, et al

It is certified that error appears in the above-identified patent and that said Letters Patent is hereby corrected as shown below:

The sentence beginning at Col. 7, line 53 and ending at Col. 7, line 56 should read as follows:

$$P_3(\theta) = |\overline{AB}|\sin\Psi\cos(2\theta - 2\theta i - \Psi) - (|\overline{GA}| - x(\theta))\sin(2\theta - 2\theta i),$$

and $x(\theta)$, $|\overline{AB}|$, $|\overline{GA}|$, $\theta i$ and $\Psi$ are as defined earlier.

Signed and Sealed this

Twenty-second Day of June, 1993

Attest:

MICHAEL K. KIRK

Attesting Officer

Acting Commissioner of Patents and Trademarks